May 14, 1940. E. C. FURMAN 2,200,546
METAL GASKET AND PROVISION FOR EXTENDING THE LIKE THEREOF
Filed Aug. 12, 1938 4 Sheets-Sheet 1
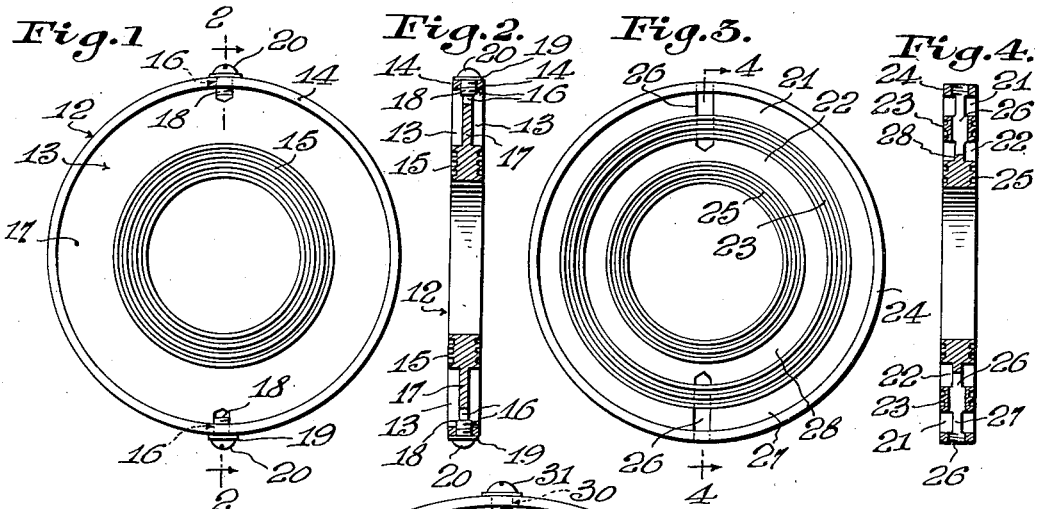
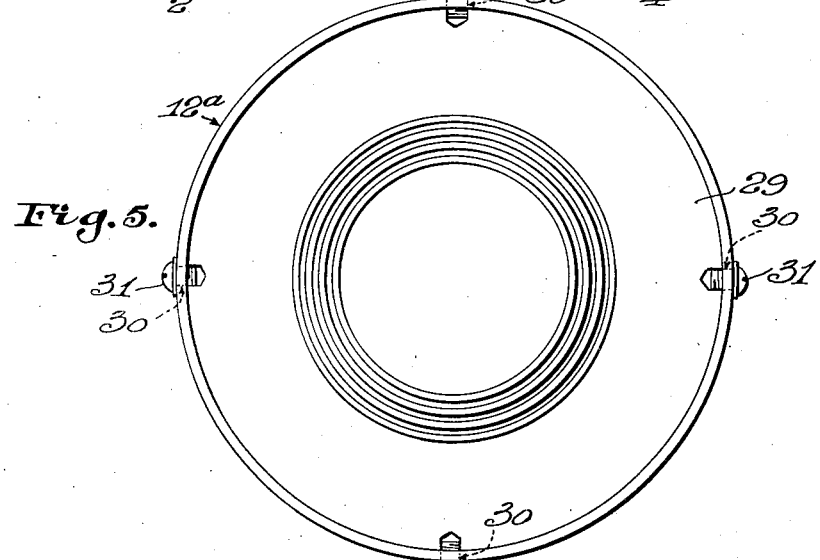
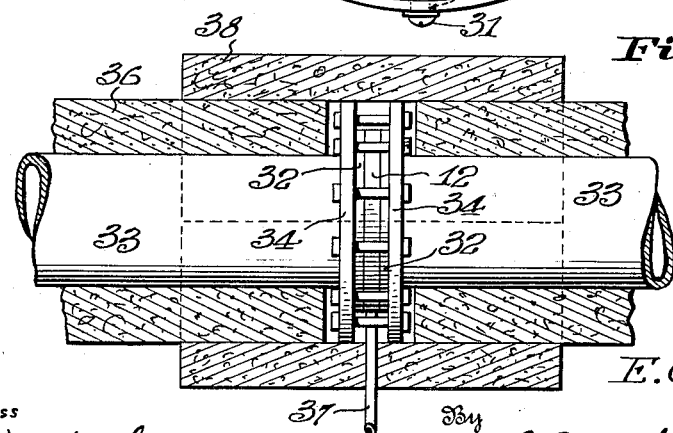
Inventor
E. C. Furman

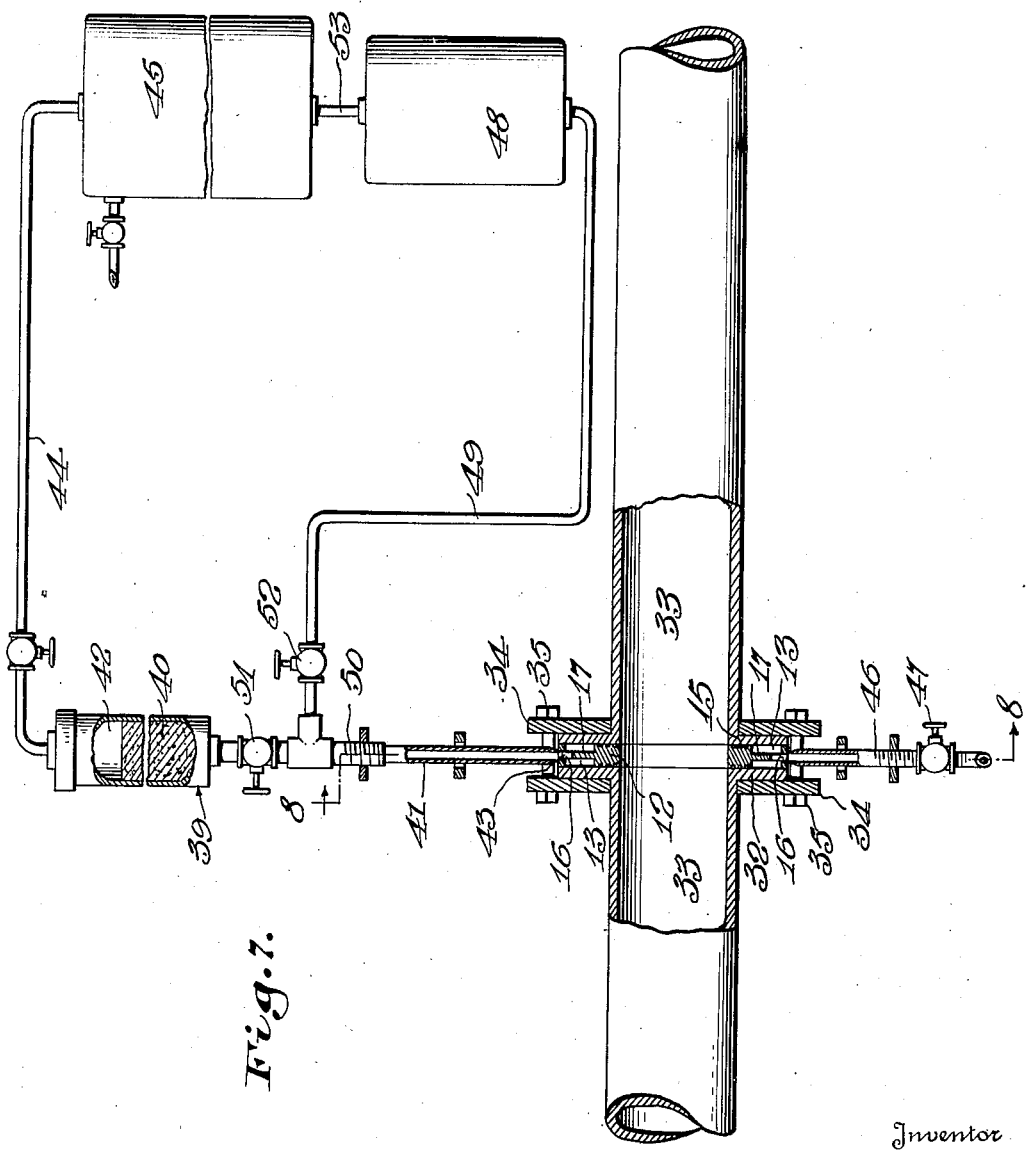

May 14, 1940.　　　　E. C. FURMAN　　　　2,200,546
METAL GASKET AND PROVISION FOR EXTENDING THE LIKE THEREOF
Filed Aug. 12, 1938　　　　4 Sheets-Sheet 3
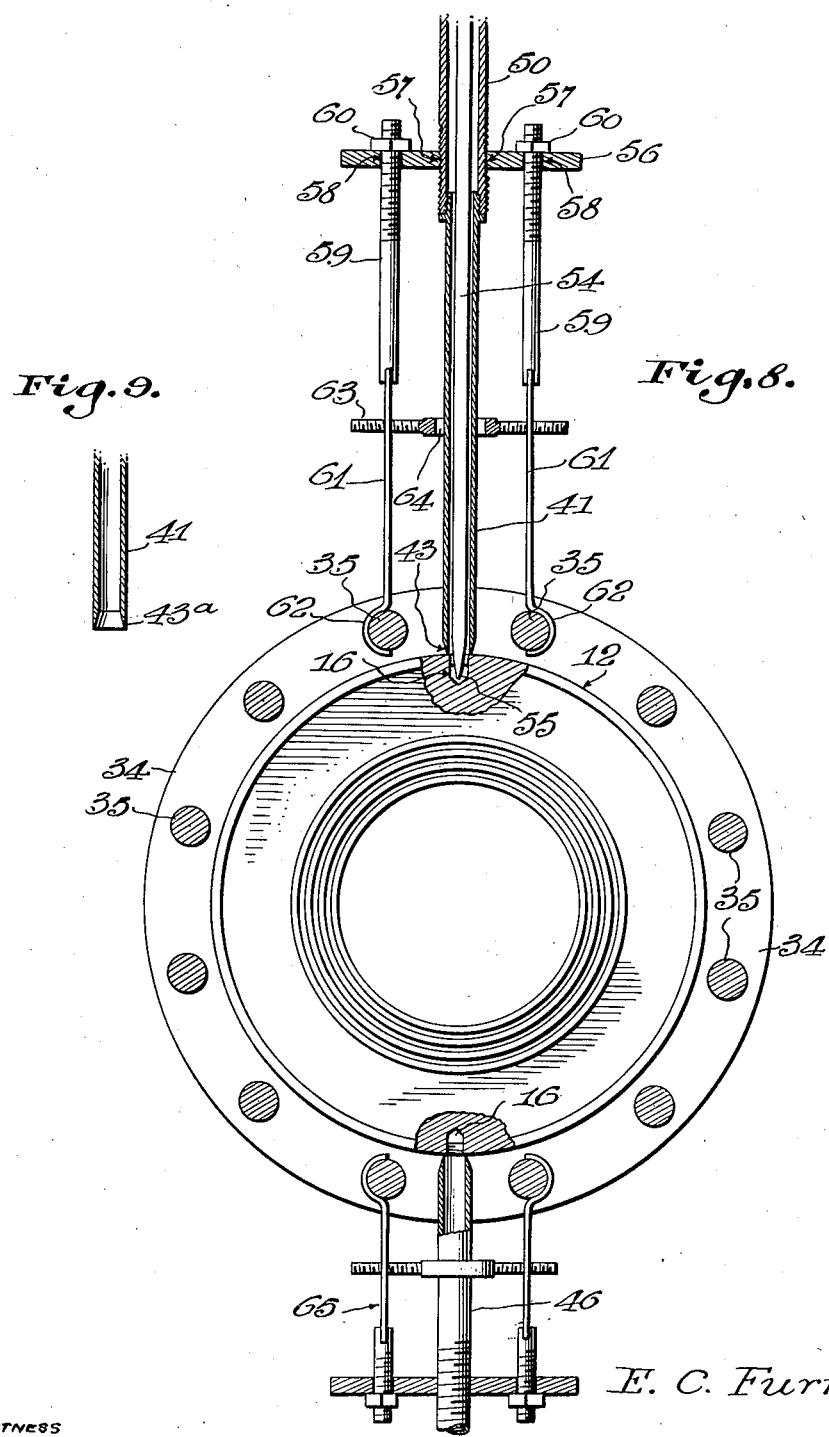

May 14, 1940. E. C. FURMAN 2,200,546
METAL GASKET AND PROVISION FOR EXTENDING THE LIKE THEREOF
Filed Aug. 12, 1938 4 Sheets-Sheet 4

WITNESS
H. Woodard

Inventor
E. C. Furman
By H. B. Wilson & Co.
Attorneys

Patented May 14, 1940

2,200,546

UNITED STATES PATENT OFFICE 2,200,546

METAL GASKET AND PROVISION FOR EXTENDING THE LIFE THEREOF

Eugene C. Furman, Hampton, Va., assignor of one-half to Edmund F. Heard, Hampton, Va.

Application August 12, 1938, Serial No. 224,627

6 Claims. (Cl. 285—111)

The invention aims to overcome long-standing difficulties in connection with metal gaskets used between flanges of pipe joints or between parts of other fluid containers, whether such pipes or containers be used for gases or for liquids.

One of the most extensively used all-metal gaskets, is provided at each of its sides with an annular channel and with inner and outer annular sealing surfaces at opposite sides of said channel, the gasket being somewhat malleable to allow said sealing surfaces to readily adapt themselves to slight irregularities in the flanges or other parts of the installation between which they are clamped. While this type of gasket is very efficient, leaks frequently start and if such leaks be neglected, they so injure the flanges or the like as to necessitate refacing thereof before a new gasket can be made to hold. It is therefore customary to substitute new gaskets for any found leaking, as soon as possible, but such substitution requires total or partial emptying of the pipes or other containers, disassembly of the joints at which leaks have been found, insertion of new gaskets, and reassembling, causing a great deal of inconvenience and expense and frequently throwing an entire plant temporarily out of operation. For such reasons, leaking gaskets are often tolerated until it becomes possible to substitute new gaskets without serious interruption to plant operation or service, but delay is often accompanied by leakage increase and by such injury to the flanges or the like between which the gaskets are held, as to prevent new gaskets from forming fluid-tight seals, necessitating expensive, arduous and costly refacing.

My invention has aimed to overcome all of the above difficulties by making novel provision whereby the side channels of a previously installed gasket may be quickly, easily and inexpensively filled with a plastic gasket-forming material without removing the gasket from the installation, said channel filling being effected either before or after any leak starts and virtually forming two new plastic gaskets between the metal gasket and the parts between which it is clamped. The invention is such that this prolongation of the life of the metal gasket may be effected without necessarily cutting off or reducing any pressure which the system or other container may carry and without draining any of the fluid therefrom. There is thus no interruption to plant operation, service, etc. and repair costs are reduced to the minimum.

In carrying out the above end, further objects have been to provide a novel gasket so constructed that its side channels can be readily filled with the plastic gasket-forming material after gasket installation; to make novel provision for filling said channels under various conditions which may be encountered; to provide a simple and easily operable apparatus to aid in carrying out the channel-filling operation and to provide for leak detection when leakage first starts across either of the inner sealing surfaces of the gasket, permitting injection of the plastic gasket-forming compound before the leak also occurs across either of the outer sealing surfaces of the gasket.

With the foregoing and minor objects in view, the invention resides in the novel subject matter hereinafter described and claimed, decription being accomplished by reference to the accompanying drawings.

Fig. 1 is a side elevation showing one form of gasket constructed in accordance with the invention.

Fig. 2 is a vertical sectional view on line 2—2 of Fig. 1.

Fig. 3 is a side elevation showing a somewhat different form of gasket.

Fig. 4 is a sectional view on line 4—4 of Fig. 3.

Fig. 5 is a side elevation showing a construction which may be used for larger gaskets.

Fig. 6 is a side elevation partly in section showing one of the gaskets installed in an insulated assembly.

Fig. 7 is an elevation partly in section showing an apparatus constructed in accordance with the invention and arranged operatively for injecting the gasket-forming plastic into the side channels of a gasket and simultaneously venting any fluid which may be within said channels.

Fig. 8 is an enlarged sectional view on line 8—8 of Fig. 7, also illustrating the spear which is used to operatively position the apparatus with respect to the openings in the edge of the gasket.

Fig. 9 is a detail sectional view showing a slight modification.

Fig. 10 is a transverse sectional view showing the apparatus which is preferably used when filling the channels of a relatively large gasket.

Fig. 11 is a detail radial sectional view showing a somewhat different form of gasket in a slightly different relation with the pipe flanges or the like.

Figures 10, 11:
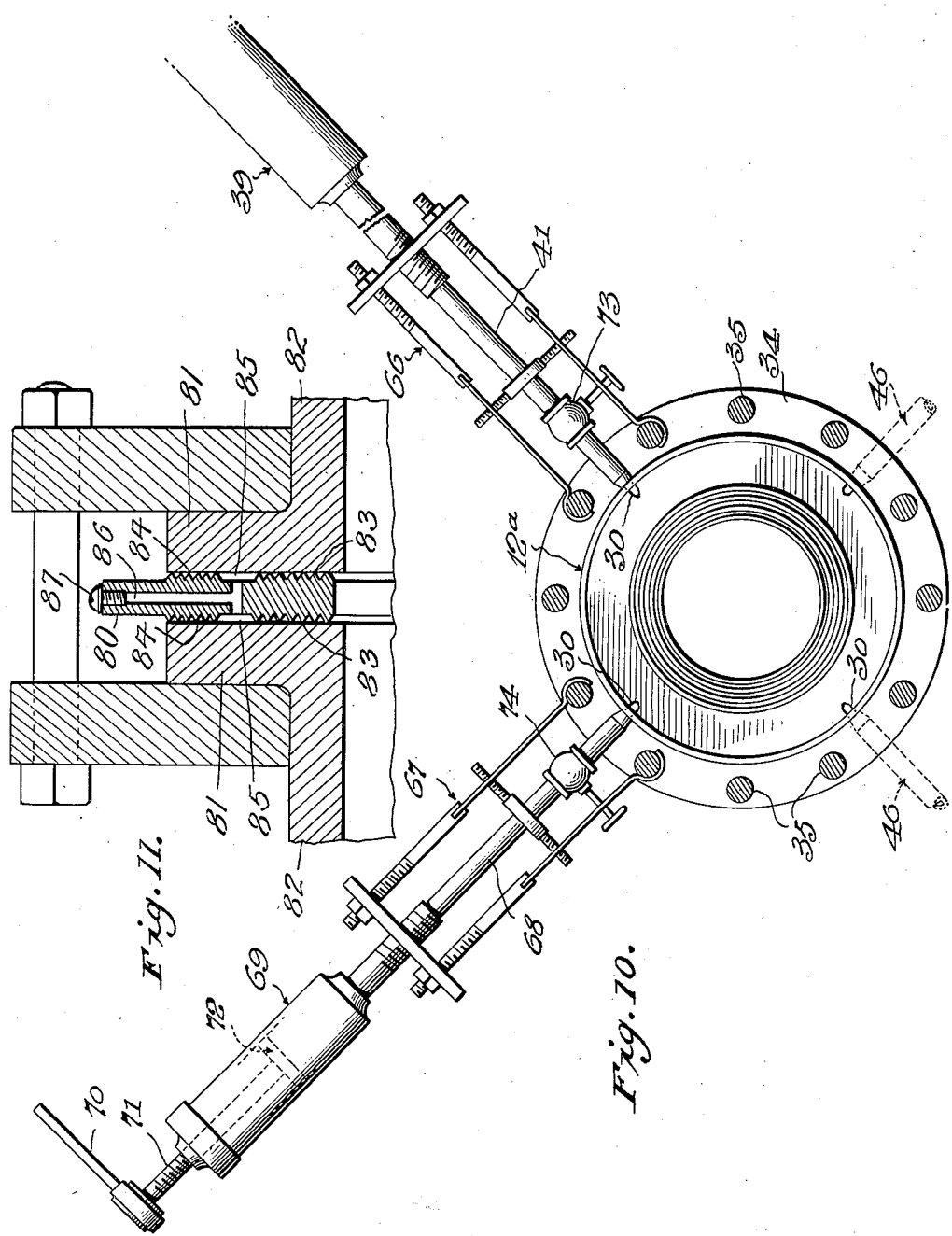

In Figs. 1 and 2, I have shown an all-metal gasket 12, each side of which is provided with an annular chamber 13, and with outer and inner sealing surfaces 14 and 15 at opposite sides of each channel, the sealing surfaces 15 being preferably circumferentially ribbed in the conventional manner. Radial openings 16 are formed in the peripheral edge of the gasket 12, said openings extending partly through the web 17 which forms the bottoms of the channels 13. As the gasket leaves the factory, the openings 16 are preferably closed by screw plugs 18 having soft metal gaskets 19 between their heads 20 and the outer edge of said gasket.

In Figs. 3 and 4, I have illustrated a somewhat different metal gasket, each side of which is provided with an outer annular channel 21, an inner annular channel 22, one sealing surface 23 between the two channels, one sealing surface 24 around the channel 21, and another sealing surface 25 surrounded by the channel 22. When this or a similar construction is used, the openings 26 corresponding to the openings 16 cut across the entire width of the outer web 27 and somewhat into the inner web 28, said openings therefore communicating with both channels 21 and 22. These openings, like the openings 16 may be normally plugged.

For relatively large gaskets, such as that illustrated in Fig. 5, whether the construction corresponds to that of Figs. 1 and 2, or that of Figs. 3 and 4, or be of other appropriate construction, I prefer to provide the gasket with a greater number of openings communicating with its channels 29. Four openings 30 are shown closed by screw plugs 31.

By providing any form of the gasket with one or more openings communicating with its annular side channels and extending through the outer edge of the gasket, I adapt said gasket for subsequent reception of a plastic gasket-forming material within said channels. Obviously, the gasket may be used in any installation to which it is adaptable and may be made in various dimensions and shapes as required. For illustrative purposes, I have shown the gasket 12 installed in most of the views but in Fig. 10, the gasket 12ᵃ is constructed according to the gasket shown in Fig. 5. For sake of illustration, the gasket 12 or 12ᵃ is shown between two flanges 32 on the adjacent ends of two pipe sections 33, said pipe sections being surrounded by the usual clamping collars 34 which abut the outer sides of said flanges, said collars being rigidly connected by bolts 35 which, when tightened, draw the flanges 32 into fluid-tight contact with the opposite sides of the gasket 12. When installing the gasket, I preferably leave at least one of the screw plugs such as 20, out of the peripheral opening which previously received it. Thus, should any leakage occur past the inner sealing surface such as 15, such leakage will escape from the side channels 17 and will be readily visible so that the leak may be detected almost as soon as it starts, before it has a chance to extend also across the outer sealing surface such as 14, and the channels such as 13 may be filled with a suitable plastic gasket-forming material to stop the leak and virtually form new gaskets in the channels, between the original metal gasket and the flanges or the like with which it contacts. It will also be understood that this channel-filling and gasket-forming operation may be performed if desired before any leak starts.

When the gasket is used in an installation having an insulating covering such as 36 of Fig. 6, I preferably thread a small tube 37 into the gasket opening from which the plug was removed, and extend said tube outwardly through the usual sleeve 38 providing part of the insulation around the joint. The slightest leak will be thus disclosed, whereas without the tube 37, a slow leak could not be detected even if the leakage be liquid, for often such a leak is not sufficient to saturate the insulation entirely through its periphery, but evaporates, particularly when the leakage occurs in connection with hot pipes or the like. As soon as the leak is detected with the installation of Fig. 6, the sleeve 38 may be removed and the side channels of the gasket filled with the plastic gasket-forming material to seal the leak, virtually form new gaskets, and thus materially prolong the life of the original metal gasket.

In Figs. 7 and 8, 39 denotes a gun operated by compressed air for injecting the plastic gasket-forming material 40 into the side channels of the previously installed gasket, the gasket shown in these views being the gasket 12 of Figs. 1 and 2 having the two side channels 13 and the openings 16 communicating therewith. The gun 39 includes a discharge tube or nozzle 41 placed in communication in any suitable way with a cylinder or the like 42 which contains the plastic 40, said tube 41 having a sharpened inner end 43 to abut the gasket around one of the openings 16 and to bite slightly into the outer edge of said gasket to form a fluid-tight seal between the gun and gasket, permitting driving of the material 40 from the chamber 42 into the channels 30 when air pressure is admitted to said cylinder or the like 42 by means of a valved compressed air line 44, shown in communication with a compressed air tank 45. To the other of the openings 16, I connect a vent tube 46, the inner end of which may be shaped identically with the end 43 of the tube 41. As the plastic 40 is being injected under pressure into the channels 13, all fluid which may have previously occupied said channels 13, is driven therefrom through the vent tube 46, and the operator may judge by the character of the discharge from said tube 46, when the plastic has entirely filled the channels 13. A valve 47 in the tube 46 is then closed and the plastic injection operation is continued for a while to make certain that the channels are entirely filled and that maximum density be imparted to the channel-filling plastic. The gun 39 and the tube 45 are left in place upon the joint until the plastic has ample time to set.

If the gasket be used under such high conditions of heat that there would be danger of the plastic 40 setting before completely filling the gasket channels, a suitable cooling fluid may be first injected into said channels and discharged therefrom through the tube 46, the injection and discharge of such fluid continuing until the gasket temperature has been reduced to a safe extent. For illustrative purposes, I have shown a tank 48 to contain an appropriate cooling medium, said tank being connected by a pipe 49 with a nipple 50 on the gun 39, above the discharge tube or nozzle 41 of said gun. The nipple 50 is provided with a cut-off valve 51 above the line 49 and this line is provided with a cut-off valve 52. Compressed air may be used to drive the cooling medium from the tank 48 and for illustration, I have shown this tank connected at 53 with the compressed air tank 45. With the valve 51 closed and valve 52 opened, it will be seen that the cooling medium may flow through the nipple 50 and tube 41 into the ring channels 13 and may discharge from said channels through the tube 46. Then, when sufficient cooling has been effected, valve 52 is closed and valve 51 opened, whereupon the plastic 40 will be driven by air pressure from the gun 39 into the channels 13 to fill the latter. Obviously, the ingoing plastic drives out any of the cooling medium left in the channels.

For centering the tube 41 or 46 with regard to the opening 16 with which it is to coact, I preferably provide a spear 54 which is insertible longitudinally through said tube, said spear being shown only in Fig. 8. This spear is provided with a pointed inner end 55 for reception in the opening 16 insuring that the sharpened inner edge 43 of said tube shall be disposed in concentric relation with the opening. Instead of beveling the tube externally to provide the beveled or sharpen edge 43, it may be beveled internally as seen at 43ª in Fig. 9.

For securing the gun 39 in operative relation with the gasket, I provide a novel clamp, the construction of which is shown most clearly in Fig. 8. A plate 56 is provided, said plate having an opening 57 through which the nipple 50 is adjustably threaded. At opposite sides of the opening 57, the plate 56 is formed with other openings 58 through which rods or hook shanks 59 pass, the outer ends of these rods or shanks being provided with nuts 60. The inner ends 61 of the members 59 are flattened to permit some lateral springing thereof, and they are provided with opposed hooks 62 to embrace two of the bolts 35 at opposite sides of the opening 16 with which the gun 39 is to be connected. A turnbuckle 63 is provided to draw the arms, shanks or the like 61 inwardly toward each other to hold them tightly engaged with the bolts 35, said turnbuckle having an opening 64 through which the tube 41 may pass. The clamp is first secured in place upon the pipe joint or the like, the tube 41 is then inserted inwardly through the opening 57, and the nipple 50 is threaded into said opening 57. Then, after inserting the spear 54, said nipple 50 is threaded forcibly into said opening 57, causing the inner end of tube 41 to air-tightly seal against the edge of the gasket. The spear is then removed.

A suitable clamp 65 is employed to secure the tube 46 in operative relation with the gasket, and for illustrative purposes, this clamp is a virtual duplicate of the clamp above described for the gun 39, with the exception of proportions.

In Fig. 10, the air-operated gun 39 is shown operatively connected with one of the openings 30 of the gasket 12ª (Fig. 5), by means of a clamp 66 which may be identical with the clamp illustrated in Fig. 8. By means of a duplicate or similar clamp 67, I connect the discharge tube or nozzle 68 of a hand-operated gun 69 with another of the openings 31. Vent tubes such as 46 above described, may be connected with the others of the openings 30 by clamps such as the clamp 65. The gun 69 is preferably provided with a ratchet handle 70 for operating a slowly pitched screw 71 which in turn operates an ejecting piston 72 for the plastic. Both guns are filled with this plastic, the gun 39 is used to rapidly fill the gasket channels, and the more powerful gun 69 is then employed to inject additional plastic into said channels to increase the density of the channel contents. The discharge tube or nozzle 41 of the gun 39 is provided with a suitable valve 73 and the corresponding tube 68 of the hand gun 69 is provided with a similar valve 74. When either gun is being used, the valve of the other gun is closed.

The "set-up" shown in Fig. 10 is preferable for rather large gaskets in which the ingoing plastic must travel so far that there would be danger of setting before completely filling the channels, were it not injected very rapidly. With such rapid injection, however, the plastic may not be under such compression and density as to produce an effective seal. Therefore, after the channels have been filled by means of the air-operated gun 39, the more powerful screw and ratchet gun 69 may be used to force an additional quantity of the plastic into the channels under greater pressure to insure the required density. The valves of the vent pipes 46 are, of course, closed after these pipes have performed their function, the valve 73 of the gun 39 is closed after this gun has been operated, and the valve 74 of the gun 69 is closed after the final injection step has been performed by this gun, the apparatus being left in this condition upon the pipe joint or other container until the plastic gasket-forming material has had time to set in the gasket channels. Obviously, should a joint or the like upon which the apparatus of Fig. 10 is being used, require cooling before injection of the plastic, the gun 39 may be equipped with suitable provision for attaining this end, as shown for instance in Fig. 7.

While the apparatus disclosed is novel insofar as I am aware and may be considered preferred, other appropriate means could of course be used for aiding in filling the gasket channels.

With regard to the gasket, it is original with me, insofar as I know, to so construct said gasket as to adapt it for subsequent injection of the plastic gasket-forming material into a channel or channels of said gasket. I also consider it novel to provide an assembly including a channeled gasket, with an open vent acting as a telltale for early detection of any leak, and in insulated installations, to provide a vent tube extending to the exterior of the insulation, so that any leakage will be detectable and will not be absorbed (if liquid) by the insulation and evaporated without detection.

It is to be understood that the present disclosure is illustrative rather than limiting and that numerous variations may be made within the scope of the invention as claimed.

In Fig. 11, a gasket 80 is shown of greater radial width than the flanges 81 of the pipes or the like 82 between which it is clamped, said gasket projecting beyond the peripheral edges of said flanges. The opposite sides of the gasket 80 are provided with inner and outer annular sealing means 83 and 84 and with annular channels 85 between said sealing means. Any suitable number of ports such as 86 may be provided, each port being branched at its inner end for communication with the channels 85. Each port may be plugged normally as shown at 87 if desired.

What is claimed is:

1. A metal gasket having an annular side channel, annular sealing surfaces at opposite sides of said channel, and at least one opening from the outer edge of the gasket to said channel through which a plastic gasket-forming material may be injected into said channel after installation of the gasket.

2. A metal gasket having at least two annular channels disposed one in each of its sides, annular sealing surfaces at opposite sides of each of said channels, a web between said channels, and at least one opening extending from the outer edge of the gasket through at least part of said web into communication with said channels, whereby a plastic gasket-forming material may be simultaneously injected into both of said channels through said opening after installation of the gasket.

3. An installed gasket having an annular side channel between inner and outer annular sealing surfaces, and an opening from said channel through the outer edge of the gasket, whereby any leakage past said inner sealing surface into said channel will escape through said opening and give warning of the leak before the outer sealing surface is impaired.

4. A gasket installed between two members, the installation being covered with insulation, said gasket having an annular channel between inner and outer annular sealing surfaces, and a leakage discharge tube communicating with said channel and projecting from said gasket through said insulation, whereby any leakage past said inner sealing surface into said channel will escape through said tube and give warning of the leak before the outer sealing surface is impaired.

5. In an apparatus for injecting a plastic gasket-forming material into a channel of a metal gasket secured between bolt-connected flanges; a tube to register with a peripheral opening in the gasket, a plate through which a portion of said tube is threaded, two hook shanks at opposite sides of said discharge tube and connected at their outer ends with said plate, the inner ends of said shanks being provided with opposed hooks to embrace two of the flange-connecting bolts, and a turn-buckle connecting said shanks for pulling them inwardly to hold said hooks engaged with said bolts, said turn-buckle having an opening through which said discharge tube passes.

6. A gasket having an anular side channel, annular sealing surfaces at opposite sides of said channel, and at least one opening through which to inject a plastic gasket-forming material into said channel, said opening having an inner end which communicates with said channel and an outer end which opens through a portion of the gasket accessible after installation.

EUGENE C. FURMAN.